US010639544B2

(12) United States Patent
Scott et al.

(10) Patent No.: US 10,639,544 B2
(45) Date of Patent: May 5, 2020

(54) GAMING SYSTEM FOR MODULAR TOYS

(71) Applicant: Microsoft Technology Licensing, LLC, Redmond, WA (US)

(72) Inventors: James William Scott, Cambridge (GB); Haiyan Zhang, Cambridge (GB); Nicolas Villar, Cambridge (GB); Greg Saul, Cambridge (GB); Alexandra Keeley Bunting, London (GB); Lee Jason Schuneman, London (GB); Philip Robert Harrison, Chalfont St. Giles (GB); Jonathan Steven Robinson, Farnham (GB); Sabina Lopez-Moreno, London (GB); Simone Rita Thomas, Cambridge (GB); Patrizio Spadoni, Oxford (GB); Alex Hall, Cambridge (GB); Tariq Adaci, London (GB); Levi Naess, London (GB); Sebastien Vandenberghe, London (GB); Alma Coyolxauhqui Salinas Lopez, London (GB); Simon Jay Carter, Cambridge (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/228,011

(22) Filed: Dec. 20, 2018

(65) Prior Publication Data

US 2019/0232158 A1 Aug. 1, 2019

Related U.S. Application Data

(63) Continuation of application No. 15/383,386, filed on Dec. 19, 2016, now Pat. No. 10,159,894, which is a
(Continued)

(51) Int. Cl.
*A63F 9/24* (2006.01)
*A63F 13/235* (2014.01)
(Continued)

(52) U.S. Cl.
CPC .......... *A63F 13/235* (2014.09); *A63F 13/245* (2014.09); *A63F 13/69* (2014.09); *A63F 13/98* (2014.09)

(58) Field of Classification Search
CPC ... A63F 13/235; A63F 13/98; A63F 2300/206
See application file for complete search history.

(56) References Cited

U.S. PATENT DOCUMENTS 10,089,253 B2 10/2018 Villar et al.
2001/0049249 A1* 12/2001 Tachau .................. A63H 17/34
446/397

(Continued)

FOREIGN PATENT DOCUMENTS

CN 101006398 A 7/2007
CN 101743043 A 6/2010
(Continued)

OTHER PUBLICATIONS

"Second Office Action Issued in Chinese Patent Application No. 201580013135.4", dated Feb. 19, 2019, 6 Pages.
(Continued)

*Primary Examiner* — Steve Rowland
(74) *Attorney, Agent, or Firm* — Alleman Hall Creasman & Tuttle LLP

(57) ABSTRACT

An interactive computer game is described which works in conjunction with a number of physical modules that a user can connect together in different ways to form a coherent physical whole object. The game receives data from the object via a wireless link, the data identifying at least which modules form part of the object and updates game play
(Continued)

based on the data received. At some point within the game play, the game presents an objective or goal to the user which the user can only achieve by interacting with the physical object formed from the modules. In an embodiment, this interaction comprises re-arranging the modules or swapping modules to form an object with a different visual appearance, moving all or part of the object and/or interacting with a sensor on a module in the object. The game may receive further data from the object during the user interaction.

20 Claims, 7 Drawing Sheets

Related U.S. Application Data continuation of application No. 14/204,239, filed on Mar. 11, 2014, now Pat. No. 9,555,326.

(51) Int. Cl.
*A63F 13/245* (2014.01)
*A63F 13/69* (2014.01)
*A63F 13/98* (2014.01)

(56) References Cited

U.S. PATENT DOCUMENTS

| | | |
|---|---|---|
| 2003/0026090 A1 | 2/2003 | Bornovski |
| 2005/0017450 A1* | 1/2005 | Weisman ............ A63F 3/00697 273/288 |
| 2007/0072680 A1* | 3/2007 | Ikeda .................. A63F 13/06 463/43 |
| 2009/0197658 A1* | 8/2009 | Polchin ................ A63F 13/02 463/9 |
| 2010/0007528 A1* | 1/2010 | Urata .................. G06F 3/0346 341/20 |
| 2010/0026458 A1* | 2/2010 | Samdahl ............ G07F 17/3225 340/10.1 |
| 2010/0052916 A1 | 3/2010 | Canora et al. |
| 2010/0144429 A1 | 6/2010 | Ryan et al. |
| 2013/0050958 A1 | 2/2013 | Bdeir |
| 2013/0173658 A1 | 7/2013 | Adelman et al. |
| 2015/0258436 A1 | 9/2015 | Villar et al. |
| 2017/0177512 A1 | 6/2017 | Villar et al. |
| 2018/0365174 A1 | 12/2018 | Villar et al. |

FOREIGN PATENT DOCUMENTS

| | | |
|---|---|---|
| CN | 101795738 A | 8/2010 |
| CN | 202006010 U | 10/2011 |
| CN | 103281928 A | 9/2013 |
| EP | 1287869 A2 | 3/2003 |
| KR | 20020092062 A | 12/2002 |
| WO | 2010063938 A1 | 6/2010 |

OTHER PUBLICATIONS

"First office action and Search Report Issued in Chinese Patent Application No. 201580013139.2", dated Feb. 3, 2019, 9 Pages.
"Second Office Action Issued in Chinese Patent Application No. 201580013167.4", dated Feb. 26, 2019, 10 Pages.
"Final Office Action Issued in U.S. Appl. No. 15/646,004", dated Jan. 10, 2019, 10 Pages.
"Office Action Issued in European Patent Application No. 15716199.3", dated Feb. 12, 2019, 6 Pages.
"Office Action Issued in European Patent Application No. 15718279.1", dated Jan. 22, 2019, 5 Pages.
"Office Action Issued in Chinese Patent Application No. 201580013135.4", dated Sep. 30, 2018, 9 Pages.
"Office Action Issued in Chinese Patent Application No. 201580013171.0", dated Jan. 2, 2019, 9 Pages.
"Non-Final Office Action Issued in U.S. Appl. No. 16/109,117", dated Sep. 16, 2019, 9 Pages.
"Third Office Action Issued in Chinese Patent Application No. 201580013167.4", dated May 24, 2019, 8 Pages.
"Office Action Issued in European Patent Application No. 15762353.9", dated Jun. 12, 2019, 5 Pages.
"Third Office Action Issued in Chinese Patent Application No. 201580013135.4", dated Jul. 8, 2019, 18 Pages.
"Second Action Issued in Chinese Patent Application No. 201580013139.2", dated Jul. 8, 2019, 18 Pages.
"Office Action Issued in Chinese Patent Application No. 201580013167.4", dated Jul. 31, 2019, 13 Pages.
"Office Action Issued in Chinese Patent Application No. 201580013139.2", dated Oct. 23, 2019, 9 Pages.
"Office Action Issued in Chinese Patent Application No. 201580013135.4", dated Nov. 5, 2019, 7 Pages.

* cited by examiner

GAMING SYSTEM FOR MODULAR TOYS

RELATED APPLICATIONS

This application is a continuation of U.S. patent application Ser. No. 15/383,386, filed Dec. 19, 2016, which is a continuation of U.S. patent application Ser. No. 14/204,239, filed on Mar. 11, 2014, now granted as U.S. Pat. No. 9,555,326, the entire contents of each of which are incorporated herein by reference.

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known interactive computer games.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

An interactive computer game is described which works in conjunction with a number of physical modules that a user can connect together in different ways to form a coherent physical whole object. The game receives data from the object via a wireless link, the data identifying at least which modules form part of the object and updates game play based on the data received. At some point within the game play, the game presents an objective or goal to the user which the user can only achieve by interacting with the physical object formed from the modules. In an embodiment, this interaction comprises re-arranging the modules or swapping modules to form an object with a different visual appearance, moving all or part of the object and/or interacting with a sensor on a module in the object. The game may receive further data from the object during the user interaction.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
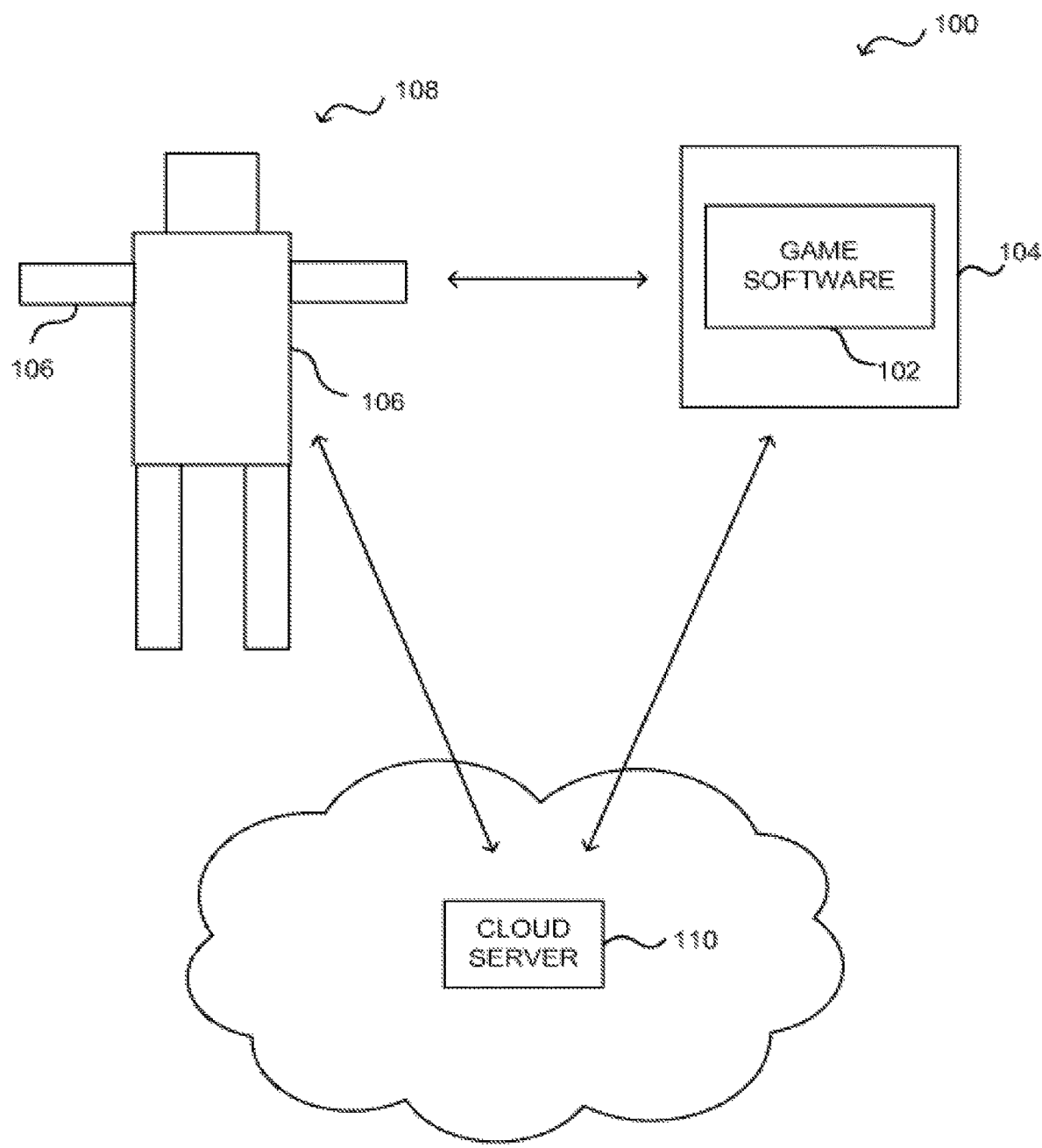
FIG. 1 is a schematic diagram of a gaming system comprising an interactive computer game which runs on a computing-based device and interacts with a plurality of modules.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

An interactive computer game is described below which is designed to work with a collection (or set) of physical modules that a user can connect together in many different ways (using two or more modules from the set) to form a coherent physical whole object. In various examples, the object may be formed from three or more modules from the set. The physical modules, once formed into an object by a user, act as a user input device for the game such that a user can affect the operation of the game by interacting with a virtual representation of the object within the game and also by interacting with the physical coherent whole object itself.

The operation of the game (e.g. the GUI and/or the game play itself) is affected by the particular modules which are put together to form the object. User interaction with one or more modules or one or more objects (formed from modules) translates into inputs to the game and the translation (from user interaction to game input) may be performed within a module, object and/or within the game. The game inputs (and hence the user interactions) affect the operation of the game. As well as responding to user interactions in a style of game play which may be described as non-directed (because the game does not force or suggest any particular interaction with the modules), the game also provides directed game play.

In the directed game play, the game presents goals or objectives to the user (who might also be referred to as a player) where those goals/objectives require the player to interact with the modules in order to further progress within the game, i.e. the user cannot achieve the goal/objective without interacting with the modules. The interaction (to achieve the goal) may be with the object as a whole (where the object is formed from two or more modules), with a plurality of objects or with one or more modules that are part of an object. For example, a user may need to rearrange the modules, swap modules in/out of the object (e.g. so the object is formed from modules A, B, D instead of A, B, C), move one or more modules (e.g. with respect to other modules in the object), interact with a sensor on a module, interact with the whole object (e.g. by moving a vehicle around a track) and/or bring two objects into proximity with each other. By performing the required interaction, the user may be able to progress to a new level, achieve a higher score, win a contest, unlock additional features (e.g. hidden features, mini-games, new levels, etc.) within the game, get an "achievement" awarded to them, assist other players in cooperative multiplayer scenarios, play against other players in competitive multiplayer scenarios, or otherwise achieve the objective set.

The progression which is achieved through the interaction with modules (and hence achieving the objective set) may be linear progression (e.g. progression to the next level) or may be non-linear progression which results in an enhancement to the game play. For example, the interaction may unlock some optional content e.g. additional virtual clothing for the virtual character which is not required to complete the main storyline of the game.

The directed game play may be explicit, in that the goals/objectives and the corresponding need to interact with the modules are clearly communicated to the user (e.g. through messages within the graphical user interface, GUI) and this is shown in the first two examples in FIG. 4 (described below). Alternatively, the goals/objectives and/or the need to interact with the modules may be implicit, in that the goals/objectives or required arrangement of modules are known to the game but are not communicated to the user and must be discovered by the user and this is shown in the third example in FIG. 4 (described below). The use of implicit directed game play adds further challenges to the user and enhances the user experience.

In various examples, a user may need to interact with the whole object (e.g. by moving a vehicle around a track) in order to further progress within the interactive software experience. In other examples, the user may be required to: add or remove modules from the coherent whole, e.g. to equip a particular weapon; to swap modules between multiple coherent whole objects (e.g. to transfer an "arm" from one robot to another robot), or to use input capabilities on the object or its constituent modules, e.g. to rotate a module in its socket, or to tap a module equipped with a button, accelerometer or other sensor, etc. In yet more examples, directed play may have more abstract goals requiring the user to formulate tactics or strategies for using the modules. For example, in a battle game, various modules may have different capabilities to attack or defend in certain ways, and the player must try to beat an opponent by swapping in and out modules in a way to maximize the chance of causing damage to the opponent while reducing damage caused to their own game character.

FIG. 1 is a schematic diagram of a gaming system 100 comprising an interactive computer game 102 which runs on a computing-based device 104 and interacts with a plurality of modules 106. The game software 102 (which comprises device-executable instructions, which when executed implement the features described herein) may be stored on the computing-based device 104 or may be stored remotely. The game may be implemented in a client/server fashion so that some of the game (e.g. the user interface) is running locally on the device 104, while some may be running on a remote server. The modules 106 can be connected together by a user to form a coherent physical whole object 108 which communicates with the game software 102 (directly or via a server). The system 100 may further comprise a remote (e.g. cloud-based) server (or collection of servers) 110 which may, for example, store information about the modules and/or the game software and this is described in more detail below. Although FIG. 1 shows a single object 108, in other examples there may be more than one object 108 which interacts with the game 102, multiple computing devices 104 (e.g. for multiplayer scenarios or for advanced single player scenarios), or multiple games 102.

Figure 2:
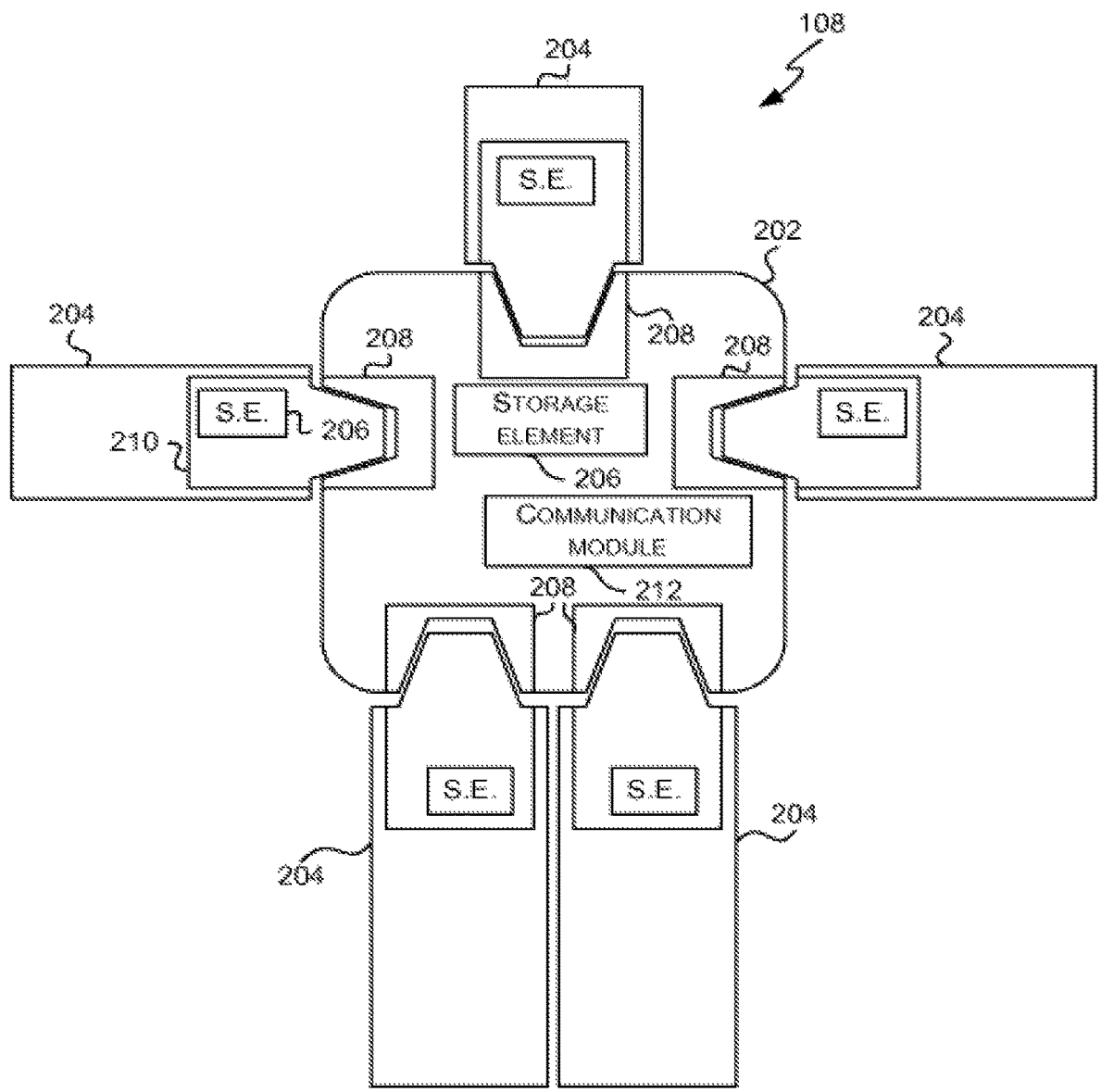
FIG. 2 shows an enlarged view of the coherent physical whole object shown in FIG. 1.

FIG. 2 shows an enlarged view of the coherent physical whole object 108 shown in FIG. 1. It can be seen in FIG. 2 that each module 106, 202, 204 comprises a storage element 206 (e.g. a memory) and one or more connectors 208, 210. The connectors 208, 210 physically attach the modules 106, 202, 204 together and may also pass data and power between modules. The storage element 206 which may be integrated within a connector (e.g. as shown in module 204 in FIG. 2) or separate from a connector (e.g. as shown in module 202 in FIG. 2), is arranged to store an identifier (ID) of the module (which in some examples may be a unique ID for the module or a unique ID for the type of module) and may also store other data, such as data relating to the module (which may be referred to as module data). The IDs are used by the game 102 to identify which modules 106 have been used to form the object 108, and this in turn affects the game play as described below.

Once assembled by a user from the modules 106, 202, 204, the coherent physical whole object 108 is physically attached together to form a single object, i.e. requiring a deliberate action by the user to detach (e.g. an applied force to overcome a mechanical friction fit or a magnetic attachment holding the modules together, or an unclasping or threading action so that a module can be removed or disconnected from an adjacent module). This is in contrast to systems in which a module or modules are sensed to be near or touching one another, but no mechanical element holds them together (with the exception of gravity, if the whole assembly is only lifted vertically from underneath). The coherent physical whole object 108 is moveable freely (e.g. in three dimensions) by a user and is capable of communicating with the interactive software experience while it is in motion. The coherent physical whole object 108 (and/or the modules from which it is formed) may comprise mechanical articulation or movement affordances, e.g. it may have joints such as hinges, or some elements may be mobile compared to other elements, e.g. sliding or rotating with respect to one another.

The modules 106, 202, 204 comprise sub-components of a single game piece (which may be referred to as a modular toy) with a game piece comprising two or more (or in some examples, three or more) modules. Each module may, for example, represent parts (e.g. head, body, limbs) of a humanoid/animal/mystical character (e.g. a human, animal or robot), vehicles or parts thereof (e.g. chassis, wheels, roof, etc.), accessories for a vehicle or character (e.g. weapons, clothing, armor, or other objects which the character may wear/carry/hold), tracks (e.g. for a car, train, human, animal or other mobile object), bricks (e.g. as part of a construction set), baseboards or levels (e.g. where the tracks/bricks/baseboards/levels may form part of a playset such as a train set, model village, tower block, dolls house or other construction) or parts of an educational toy (e.g. parts of a molecular model, skeleton or body, etc.).

At least one of the modules 106, 202, 204 in the coherent physical whole object 108 comprises a communications module 212 which enables the module 202 to communicate with the game software 102. Any suitable wireless communication technology may be used and in various examples Bluetooth®, Bluetooth® Low Energy (BLE), WiFi™, WiFi™ Direct, 802.15.4, etc. may be used. The communications module 212 may communicate directly with the computing device 104 running the interactive computer game 102 (e.g. smartphone, tablet computer, games console, etc.) or may communicate via a network (e.g. a home network or the internet) or intermediary device (e.g. a wireless access point) or intermediary server (e.g. cloud server).

The information which is communicated from the coherent physical whole object 108 to the interactive computer game 102 (via the communication module 212) may include the IDs of the modules 106, 202, 204, information about their arrangement (which may be referred to as topology information), sensor data (if any of the modules include sensors), some or all of the module data stored in the modules etc. Where only one of the modules comprises a communication module 212 (e.g. as shown in FIG. 2) this module 202 (which may be referred to as a core module) may aggregate the data for the other modules 204 in the object 108 (which may be referred to as peripheral modules) and send the aggregated data to the interactive computer game 102. Where each module comprises a communication module, each module may communicate data about itself to the interactive computer game 102. In other examples, any module that comprises a communication module 212 may send its own data and optionally data for one or more other modules within the object 108.

In various examples, one or more of the modules (e.g. a module 202 which also comprises a communication module 212) may also comprise a processor arranged to collect the IDs of other modules (e.g. all modules or a subset of modules) connected to form the coherent physical whole 108 and to collect other data from each of the modules. The processor may be a microprocessor, controller or any other suitable type of processor for processing computer executable instructions to control the operation of the core module in order to collect data from connected modules. In various examples, the data may be collected by a core module from each of the connected modules directly (e.g. via a bus which is electrically connected via the connectors or other means, such as using NFC, QR codes or computer vision). In other examples, however, each module may collect information on its neighbors such that a core module aggregates the data provided by its direct neighbor modules.

It will be appreciated that the modules 106, 202, 204 may comprise additional elements not shown in FIG. 2, such as batteries, sensors, actuators, displays, additional hardware logic, etc. It will further be appreciated that although FIGS. 1 and 2 show one module 106, 202 as a robot body and the other modules 106, 204 as the head and limbs, each of the modules can have any physical form factor (e.g. any shape of external housing) which is compatible with the other modules (i.e. each module is shaped such that it can connect to at least one other module, without the outer housing clashing). Further examples are shown in FIG. 4 (described below).

Operation of the system 100 shown in FIG. 1 can be described with reference to the example methods shown in FIG. 3. The first method 31 is an example method of operation of the interactive computer game 102 and the second method 32 is an example method of operation of a module 106 or object 108.

As shown in the first method 31, the computer game 102 receives data from a plurality of modules (block 302). These modules may be connected together by a user to form a single object 108 or more than one object. The data received comprises the IDs of each of the modules in the object(s) and in various examples additionally comprises other data such as some or all of the module data stored within the modules and/or topology information. In response to receiving the data (in block 302), operation of the computer game is updated (block 304). The updating of the operation of the game (in block 304) may comprise displaying a graphical representation of the object(s) within the GUI and/or updating game state. The updating of game state may, for example, comprise one or more of changing the state of virtual objects or properties of such virtual objects (e.g. noting that the virtual character now has armor and so a higher "defense" rating), updating game engine state (e.g. noting that a modular object now has another piece, and computing the object's updated topology, shape, length and applying that data to the game engine) which may include physics engine state (e.g. modelling the mass or moment of inertia of virtual characters/items), etc. The updating of the operation of the game may comprise unlocking particular features, levels, games (e.g. side quests, mini-games), experiences etc. dependent upon the particular modules which form the object (e.g. a fishing game may be unlocked if the object includes a module which is shaped like a fishing rod).

The computer game presents one or more objectives (or goals) to the user which require the user to interact with the modules in order to progress within the game (block 306). This is the directed game play as described above. Following user interaction with the object/modules, further data (or updated data) may be received from the modules (block 302) and used by the computer game to determine if the objective (set in block 306) has been met (in block 304). In various examples, this further data may be received during user interaction with the object (e.g. such that the game can determine when the objective is nearly met or whether a user is progressing in the right direction to achieve an objective or in an incorrect direction).

In various examples, the computer game may substantially continually communicate with the object/modules to determine whether the object has been met. In such examples, the computer game may sense the changes made by the user while they are making the changes (e.g. by detecting in real time the addition and removal of modules). This involves the coherent physical whole object maintaining the communication capability with the computer game whilst it is being re-arranged (rather than going offline during the time while the user re-arranges the modules or otherwise re-assembles the object). This real time sensing of changes enhances user experience and game play as the computer game may be able to represent the changes as they happen (e.g. within a GUI) and/or provide hints to the user where the user is finding it difficult to achieve the objective (e.g. the changes they are making are progressing in a different direction from that required to achieve the objective) and this may result in faster reaction within the computer game (e.g. resulting in a new objective being presented more quickly or the completion of an objective being acknowledged more quickly). It also increases usability (e.g. for younger users) as a user does not need to perform two actions (re-assemble and then re-connect) but instead only has to re-arrange or otherwise interact with the object.

As described above, the progression that is achieved by interacting with the modules (and meeting the objective) may be the enabling of new features within the game, the completion of a level or challenge, the achieving of a new high score, etc. In some examples further game play may be blocked unless the objective is met by the user and in other examples the game play may continue but the user experience may be enhanced in response to achieving the defined objective. The method 31 may then be repeated, with further objectives being set by the computer game for the user (in block 306). Although FIG. 3 shows a single objective being set at a time, in various examples, multiple objects may be set in parallel.

The objectives which are presented to the user (in block 306) may be pre-defined and stored within the game software. Alternatively they may be generated dynamically (block 305). In various examples, they may be generated based at least in part on the information received from the modules (in block 302), e.g. they may be dependent on the particular combination of modules that the user has assembled into an object and/or the particular topology of the object. In various examples, the objective which is set may be generated based on the user's history (e.g. past performance) within the game or based on any other characteristics of the user or information about the user. Data detailing the user's history may, for example, be stored by the game itself or alternatively may be stored on a remote server (e.g. remote server 110 in FIG. 1) and accessed by the game (block 308). By tailoring the objectives to be specific to a user, this enhances the overall user experience within the game. In examples where the objectives are dynamically generated, this may comprise one or more of: choosing an objective or goal from a pre-existing list of possible objectives/goals (e.g. based on a characteristic of the user or another factor described above), creating an objective/goal based on random factors and using existing gameplay to date to influence the choice/creation of objective/goal.

In various examples, the entire game play may involve the setting of user goals (in block 306) and then detecting whether they have been achieved (based on data received in block 302) and responding to the user interaction which is identified based on the data received (e.g. as in the second example in FIG. 4, described below). In other examples, there may be aspects of non-directed play within the game play, either in parallel with the setting of objectives or for periods in between the setting of objectives by the computer game (in block 306). The game play may switch between directed and non-directed play autonomously or in response to user input and similarly a user may switch between interaction with the virtual object and interaction with the physical object.

In various examples, the computer game may update the game play (in block 304) based on both data received from the modules (in block 302) and additional data accessed from a remote server 110 (block 308). This remote server 110 may, for example, store additional data about each of the modules, data about which modules each user owns, user history (as described above), etc. In various examples, the remote server may store a plurality of data records, each data record relating to a physical module 106 and comprising the ID of the module, one or more properties of the module and optionally an identifier for the owner or manufacturer of the module. One or more of these fields (e.g. module ID and/or owner ID) may be verified by an authentication service which provides a method of securely verifying properties about a field's value (e.g. that the owner is correct, that the module ID has been issued to the module by a trusted party and is therefore not counterfeit, etc.).

The properties field(s) within a data record may comprise any property of the module to which the record relates (as identified by the module ID). Examples of properties include, but are not limited to: GPS location data for the module (e.g. a "home" location and/or a current location), interoperability data (e.g. which other modules or types of modules the module can interwork with and/or which interactive software experiences the module can be used with), statistics for the module (e.g. length of time in use, etc.), virtual objects associated with the module (e.g. where these objects have been collected within an interactive software experience), permissions associated with the module (e.g. which fields within the data record can be changed and by whom and in various examples the permissions may be dependent upon the use of the object, such as which interactive software experience it is being used with), interactive software experience data (e.g. textures, device-executable instructions for the software experience or a part thereof, etc.), state data (which may be specific to a particular interactive software experience or independent of any interactive software experience) and references to a secondary (or further) database (e.g. which may contain additional information about, for example, the owner of the module, as identified by the owner ID). It will be appreciated that where the properties field comprises sensitive user data, consent may be collected from the user to store and release this data.

Where the computer game accesses additional data (in block 308) which identifies those modules owned by the user, the data may be used in generating the objective which is then presented to the user (in block 306). For example, if the accessed data (from block 308) identifies that a user has a set of modules {A, B, C, D, E, F, G, H}, although they have currently assembled an object comprising only modules A, B, C and D (as determined from the data received in block 302), the objective which is set may involve swapping out some or all of modules A, B, C and D to be replaced by one or more of modules E, F, G and H. By accessing ownership information in this way, the objectives which are set a user can be tailored to be specific to them (rather than being generic and applicable to all users). This may enhance the overall user experience within the game. Objectives or optional objectives could also involve additional modules which the user does not own, e.g. those which are owned by their friends which they may borrow.

As described above, the second flow diagram 32 in FIG. 3 shows an example method of operation of a module 106, 202, 204 or an object 108. A module within an object sends initial configuration data to the interactive computer game (block 312). This configuration data includes the module's ID and may comprise data (e.g. IDs) for just the module or for the module and other modules within an object. In various examples, other data may be communicated in addition to IDs, such as topology information (e.g. the specific arrangement of modules within the object), module data stored within the module, orientation data (e.g. identifying a particular orientation of one or more modules), sensor data (e.g. where the module, or a connected module, comprises a sensor), etc. As described above, an object 108 may comprise multiple modules performing the method 32 or a single module within the object may perform the method 32 and communicate data about all the modules within the object 108.

Figure 3:
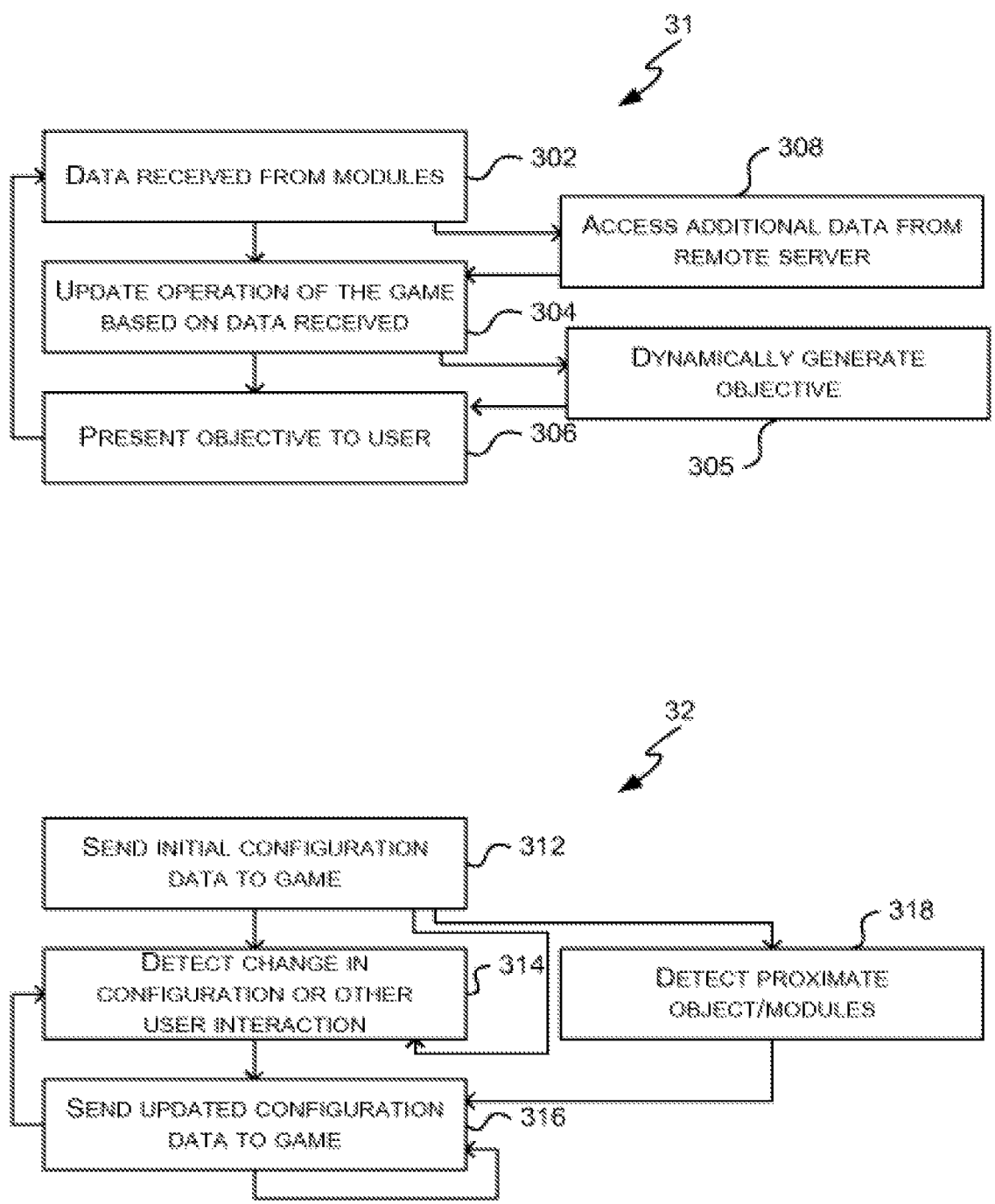
FIG. 3 shows flow diagrams of two example methods—an example method of operation of the interactive computer game and an example method of operation of a module or object.

As shown in FIG. 3, subsequent to sending initial configuration data (in block 312), updated configuration data is also sent to the computer game (block 316). In various examples, a module may detect a change in configuration of the module/object or user interaction with the module/object (block 314), e.g. as a result of sensors and/or monitoring an electrical bus within the object, and this may trigger the sending of updated configuration data (in block 316). As described above, the updated configuration data may be sent substantially continuous (e.g. few seconds or more frequently), in real time, such that the computer game is notified of user interaction with the object as it happens, rather than only being notified after the interaction (e.g. re-arrangement of modules) has been completed by the user and the user then reconnects the object to the computer game. In various examples, the configuration data may be checked (in block 316) periodically and compared to previously sent configuration data to determine whether there has been any change in the configuration data (and hence a change in configuration or user interaction). Detection of any difference when performing the comparison may trigger the communication of updated configuration data to the game (in block 316). It will be appreciated that the updated configuration data that is sent (in block 316) may be the full configuration data or may only identify the differences in the current data compared to the previously sent data. In other examples, however, the updated configuration data may be sent periodically (e.g. every minute) and the step of detecting a change (block 314) may be omitted.

In various examples, the game play may involve more than one object 108. In such examples, the sending of updated configuration data may be triggered by the detection of proximate objects/modules (block 318). In such examples, the updated configuration data which is sent to the game (in block 316) may identify which modules have been identified as being proximate (e.g. their module IDs).

Figure 4:
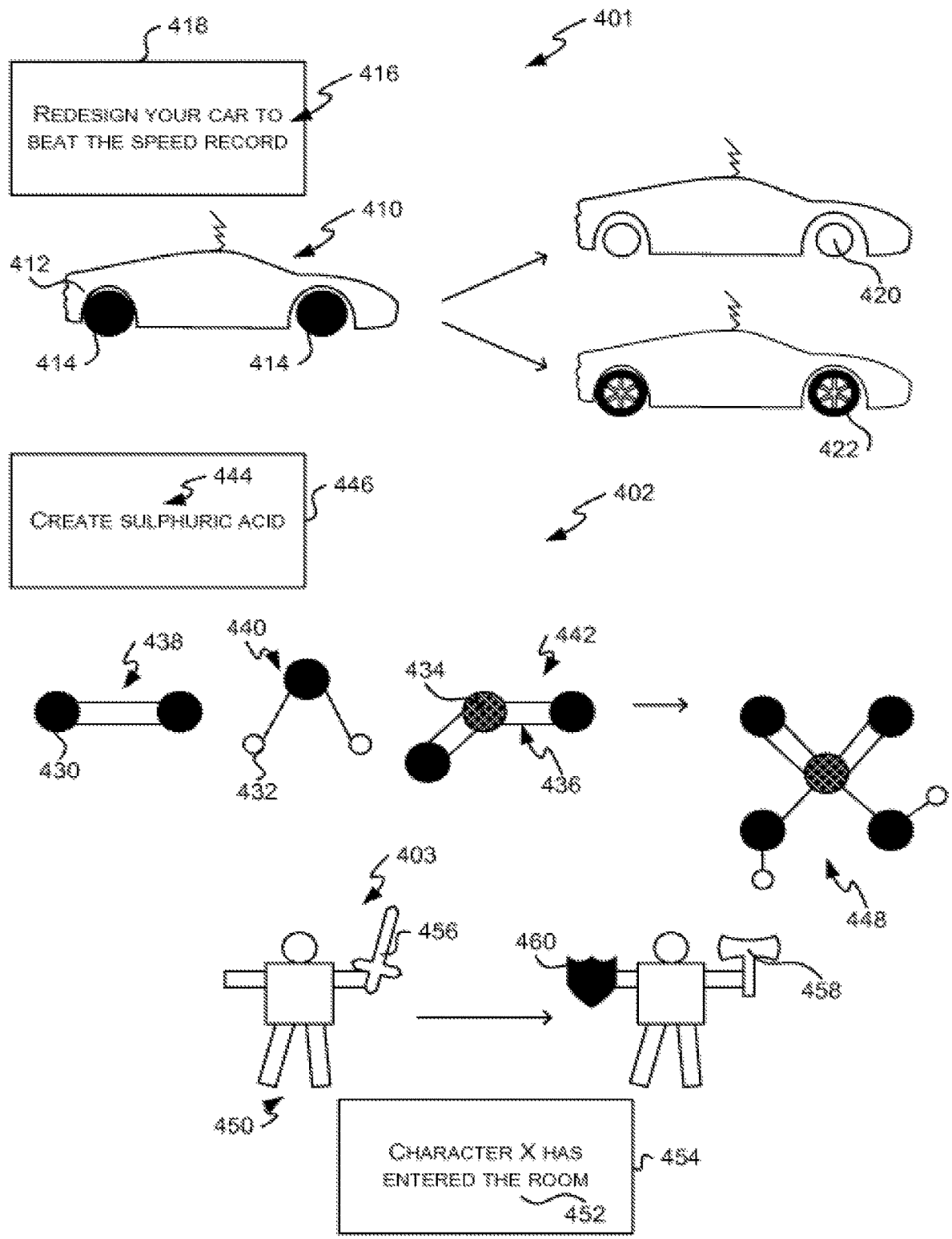
FIG. 4 shows diagrams illustrating a number of examples of directed game play scenarios.

FIG. 4 shows diagrams illustrating a number of examples of directed game play scenarios. In a first example scenario 401, the game may be a racing game which may either be played in the virtual world (within the game) with a vehicle based on the particular physical vehicle 410 assembled using modules (chassis 412, wheels 414) or may be played in the real world using remote control physical vehicles 410 (where a core module 202 within the object may comprise the remote control functionality and may be controlled by a games controller, app running on a smartphone or other device) with data being communicated back from the vehicle to the game. In other examples, the physical vehicle may be pushed around by the user or may be self-propelled (in which case, the environment, such as the living room floor with obstacles such as furniture, cushions, etc. may be sensed and rearranged by the user).

In the first example scenario 401, the game may display an objective 416 within the GUI 418 telling the user to redesign their car to beat the speed record. In this example, the user may have two other sets of wheels 420, 422 and so may pick one of them to try or may try each in turn in order to try and achieve the objective set by the computer game. As can be clearly seen from this example, even if the driving is actually performed within the virtual world, the directed play encourages an aspect of game play within the physical world (rather than just assembling the object once at the start and then not changing it) and so enhances the overall user experience.

In this example, the redesigning of the car may be performed outside of the game play, with the game play waiting to receive details of the revised configuration (e.g. using the method shown in FIG. 3), in various examples the game play may continue whilst the user is redesigning the car (or otherwise reconfiguring or interacting with the physical coherent whole object) such that the time taken by the user to perform the interaction has an effect on the game play. In a racing example, there may be other cars (e.g. virtual cars, AI controlled physical cars, cars controlled by other users, etc.) that continue the race whilst the reconfiguration is performed. This has the effect that a user not only needs to reconfigure their car appropriately (e.g. to select the right set of wheels) but also do so quickly. This adds to the user experience and excitement within the game play.

In the second example 402, the game may be an educational game with the modules 430-436 representing different atoms (Oxygen, O 430, Hydrogen, H 432, Sulphur, S 434) and the bonds 436 between them. In this example, a user may have generated three objects: oxygen gas 438 ($O_2$), water 440 ($H_2O$) and sulphur dioxide 442 ($SO_2$) and may be challenged by the game (in the form of an objective 444 displayed within the GUI 446) to create sulphuric acid 448 (e.g. as part of a lesson relating to industrial pollution). Based on the updated configuration data received by the game (e.g. as sent in block 316 and received in block 302 in FIG. 3) the game can determine whether the correct object (i.e. object 448) has been created and if not, may provide hints or more detailed instructions to assist the user in achieving the objective. As can be clearly seen from this example, the directed game play enhances the user experience and learning by involving physical play. Assembling chemical structures using the physical modules may also be much easier for users (particularly younger or less proficient computer users) than manipulating atoms and bonds in the virtual world (e.g. using a keyboard and/or mouse).

In a third example 403, the game may be an adventure game where the main character (object 450) meets various challenges and other characters which he may need to defeat to progress within the game. In this example, the objective 452 which is displayed within the GUI 454 does not explicitly identify the changes that must be made to the object 450 but instead gives details of a new event within the game world, in this case the entrance of a new character (character X) in the same room as the main character within the virtual world. This objective provides a clue (or hint) to the user that they might wish to reconfigure the object 450 to meet any challenges posed by the new arrival and in this example, the user swaps weapons 456, 458 and adds a shield 460.

Through use of the physical modules and the directed game play, the operation of the interactive computer game is affected by both a user interacting within the physical object 108 and the user interacting with a virtual representation of the object 108, and hence the game software may comprise device-executable instructions to update operation for both styles of game play. Whilst in some examples, a user may create a coherent physical whole object initially (physical interaction) and then interact with a virtual representation of the object within the game, in various examples, the directed game play (i.e. the setting of objectives) may switch between virtual interaction by the user and physical interaction with the object multiple times during game play. The switching between virtual interaction and physical interaction may be triggered by the game itself (e.g. realtime dynamic changes as part of the game), by the user (e.g. in response to pressing a particular button or control), or a combination of the game and the user.

In an example, a user may initially create the object from the modules and interact with a virtual representation of the object in the virtual phase. Once an objective is set, the game play switches to physical interaction with the coherent physical whole object. After the user has physically interacted with the modules/object (in order to meet the objective), the play may revert back to virtual interaction for a period of time until a next objective is set. In another example, the user may perform input with the physical object only, while the virtual object is used as output to the user. In a third example, both the objectives may be accomplishable using both physical or virtual interfaces, albeit they may have different affordances/constraints, allowing the user to swap between then in a dynamic fashion depending on how they prefer to play or how they think the objective is best achieved at that point in the game.

Figure 5:
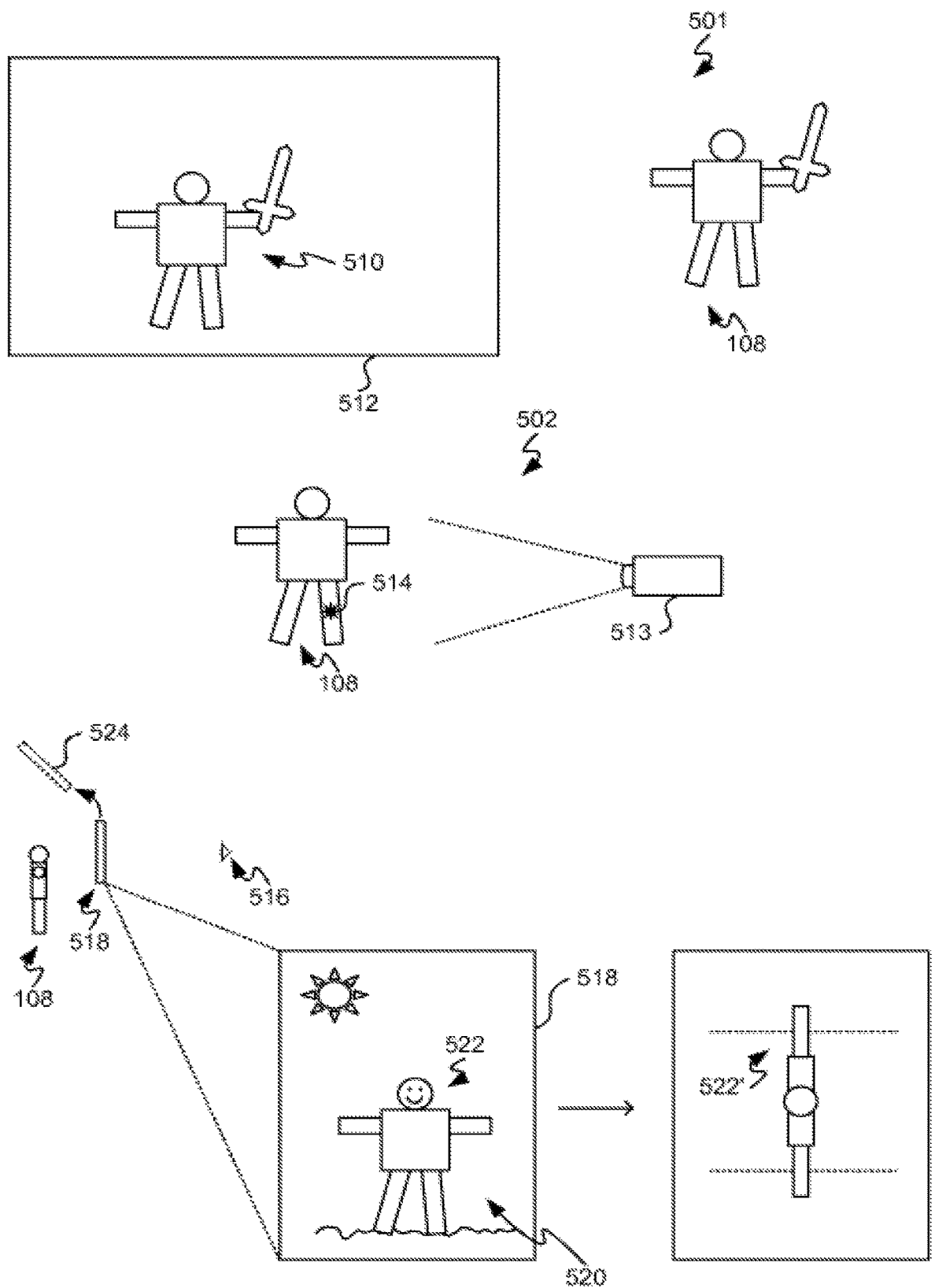
FIG. 5 shows schematic diagrams of different ways virtual representation of the object may be achieved within a virtual phase of game play.

Within the game, a virtual representation 510 of the object 108 assembled by the user may be displayed on a display screen 512 connected (or integral) to the computing-based device 104 on which the game is running, as shown in the first schematic diagram 501 in FIG. 5. This may be displayed irrespective of whether the user is interacting with the virtual representation or interacting physically with the object, or may only be displayed when the user is interacting virtually. In addition, or instead, the virtual representation may be projected onto the object 108 itself (e.g. to project, using projector 513, an injury 514 onto a limb of the object 108 when the character is hurt as shown in the second schematic diagram 502 in FIG. 5) or on to other items, such as the surrounding environment for the object (e.g. project the virtual environment into the physical world, such as a forest scene onto the carpet and any items of furniture around the object).

In various examples, an augmented reality display may be used in addition to or instead of the techniques shown in the first two schematic diagrams 501-502. As shown in the third schematic diagram 503 in FIG. 5, where an augmented reality display is used, the user 516 appears to view the object 108 "through" a handheld display 518 (e.g. a smartphone, tablet computer, etc.). The GUI 520 displayed on the display 518 shows a virtual representation 522 of the object 108 and superimposes additional elements, such as a background environment, facial features and expressions, etc. If a user moves the display 518 with respect to the object 108 (e.g. to a position 524 above the object 108), then the view of the virtual representation 522 changes accordingly (to 522') to show the object 108 (and the surrounding environment) from above.

When the user interacts within a virtual world the user may interact with the virtual representation of the object 108 or the virtual representation of the object 108 may be the avatar for the user within the virtual world. A standard user input device may be used for this virtual interaction, such as a keyboard, mouse, games controller (including camera based games controllers), touch-sensitive display, etc.

When the user interacts with the physical object (formed from the modules), data is transmitted back from the object to the game (as described above with reference to FIG. 3) which then changes the game play in the virtual world. During the physical interaction, the display on the device 104 running the interactive game 102 (or any projected images, as shown in FIG. 5 and described above) may continue to be updated and may, for example, provide sound effects, background noise and/or visual effects to enhance the physical play. For example, where in the physical phase the user is racing a vehicle (e.g. a remote control car formed from a plurality of modules), the computer game may produce sound effects for the vehicle (e.g. the sound of the engine roaring) and also background sounds (e.g. the sound of other cars in the race, crowds cheering, etc.) and the display may show the vehicle's surroundings (e.g. other cars in the race, the crowds, the track, etc.).

In various examples, the game may control some of the actions of the object 108 during a period when a user is interacting with the physical object, e.g. where one or more of the modules within the object comprises one or more actuators which can be controlled remotely by the game. In such an example, the user may interact with the physical object (and this results in inputs to the game) and additionally the game sends control signals to the physical object which result in actions of the object (e.g. moving limbs, flashing LEDs, etc.). In game play involving more than one physical object 108 (each being assembled by the user from a plurality of modules), one of the physical objects may be controlled entirely by the game (and not by the user), such that they are a physical equivalent of a non-playable character in a virtual world. In other examples, there may be more than one object which is controlled entirely by the game; however there is always one object which is controlled, at least in part, by the user.

When the user interacts with the physical object, this may be part of online game play in which the object (or modules from which it is formed) is in communication with the interactive computer game. Alternatively, this may part of offline game play when there is no communication between the physical coherent whole object the interactive computer game. The above description of the physical interaction relates to the online physical game play as the object is able to communicate with the interactive computer game, although as described above (and shown in FIG. 3), this communication may be periodic and need not be continuous.

In the offline game play, the object 108 cannot communicate with the interactive computer game and this may, for example, be because the user has taken the objects away from the computing-based device on which the game runs (e.g. into a school playground, the garden, etc.) or because connectivity has been lost for any other reason (e.g. the computing-based device is switched off or the game has been closed). In the offline game play objects/modules may record events (e.g. interactions by the user) and/or encounters (e.g. proximate modules/objects) so that the interactive game can be updated when the object reconnects to the game and in some examples, the interactive game may use the recorded data (from during the offline game play) to replay the events/encounters in the virtual world.

In the offline game play proximate objects/modules may communicate with each other. This communication may involve sharing of game state data (e.g. data which may be stored in the storage element within a module) and in various examples, proximate objects may communicate to agree an outcome of an encounter to enable each object (i.e. one or more modules within each object) to individually update locally stored game state (i.e. game state stored within a module) as a result of the encounter. In an example scenario, two robot-like objects may be brought together for a battle by one or more users during an offline physical phase of game play. The outcome of the battle (e.g. which robot won and which robot lost) may be determined by the two objects comparing game state (e.g. health values, strength values, etc.) and this may cause a change in the game state of each object (e.g. the health value of the robot that lost may be reduced and the strength value of the robot that won may be increased). The game state which is used to determine the outcome may be stored within the storage elements in the modules and the updated game state (following the battle) may also be stored in the storage elements in the modules.

In the offline game play, some of the interaction between proximate objects may be user-initiated (e.g. a user intentionally brings the two objects together, causing the recording of an encounter, etc.) and other interaction may be autonomous (e.g. an object records encounters with any proximate objects). For example, the game may give the player a bonus if their physical model has encountered other game models during the offline game play. Or the game may comprise a goods-trading experience and when two objects pass they negotiate to exchange virtual goods according to their users preset selling/buying prices for such goods. In these cases the user may not be aware of which other user around them was also carrying a compatible offline gaming object. In another example, the identities of the users that meet each other may be recorded and used to influence the game, e.g. in the virtual city game a virtual road might open up so that the character can visit other users' virtual cities if they were proximate during the offline game play. Or, in a driving game, the other drivers in a race may be chosen to be identities corresponding to the people who the user has physically been proximate to via their objects sensing each other.

The object-object communication described above as occurring within the offline game play may also occur during the online game play. In this case the user experience may be enhanced because the objects are controlled by the online computing device(s), which may be able to present a different game experience to users than any built-in (and limited) computing facilities of the object(s) themselves can.

Figure 6:
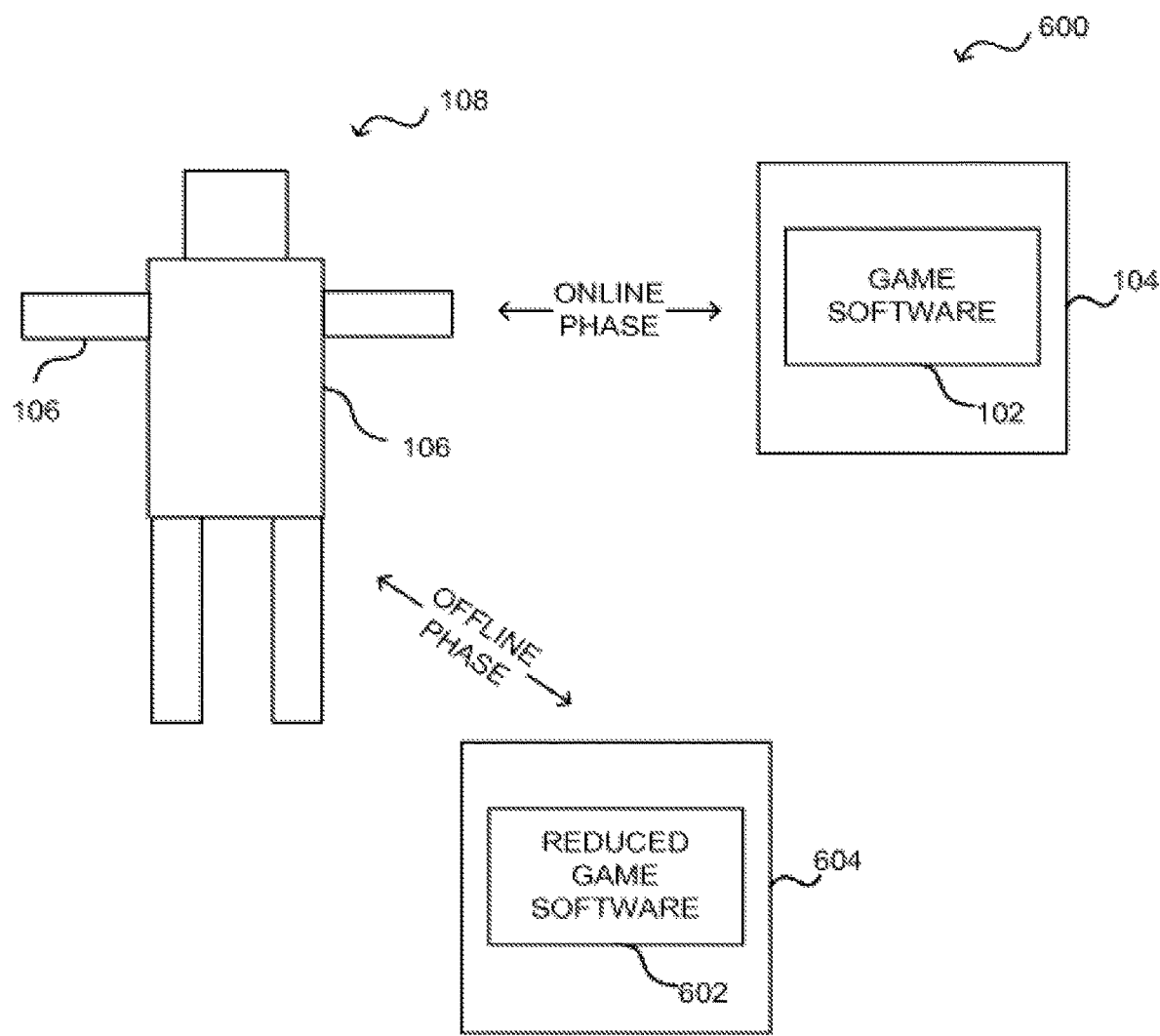
FIG. 6 is a schematic diagram of another gaming system comprising an interactive computer game which runs on a computing-based device and interacts with a plurality of modules.

Although in the offline game play the object(s) cannot communicate with the game 102 running on the computing-based device 104, in various examples there may be a separate, reduced functionality, version of the game 602 running on a separate computing-based device 604, as shown in the system 600 in FIG. 6. The two versions of the game 102, 602 are the same game, extended across two different devices; although the functionality within the two versions will be very different. In such a system 600, during the online game play, the object 108 communicates (to share data, such as module IDs and other data) with the full game 102 and in the offline game play, the object 108 communicates (to share data, such as module IDs and other data) with the reduced game 602. The full game 102 and the reduced game 602 run on separate computing devices, e.g. the full game 102 may run on a non-handheld computing device (e.g. laptop or desktop computer or non-portable games console, etc.) and the reduced game 602 may run on a handheld computing device (e.g. smartphone, portable games console, etc.), or it may run directly on the hardware comprising the modular objects which operate in a peer-to-peer manner with other hardware objects. In such an example, the virtual game play may only run within the full version of the game 102, or it may also run in the reduced game 602 when running on a mobile computing device which can present such a user interface (e.g. smartphone, portable games console, etc.). The reduced version of the game 602 stores the updated data received from the object 108 and may enable a user to query state information stored on the object 108.

Although the examples described above refer to a single game, in various examples a physical coherent whole object (or the set of modules from which it is created) may be used with multiple different games. Where this occurs, each game may store separate information on the objects and/or the games may interact to share information about the objects, e.g. if an object is "tired" then that state may persist across games. The games may be on the same platform or on different computing platforms (e.g. separate computing-based devices)

Figure 7:
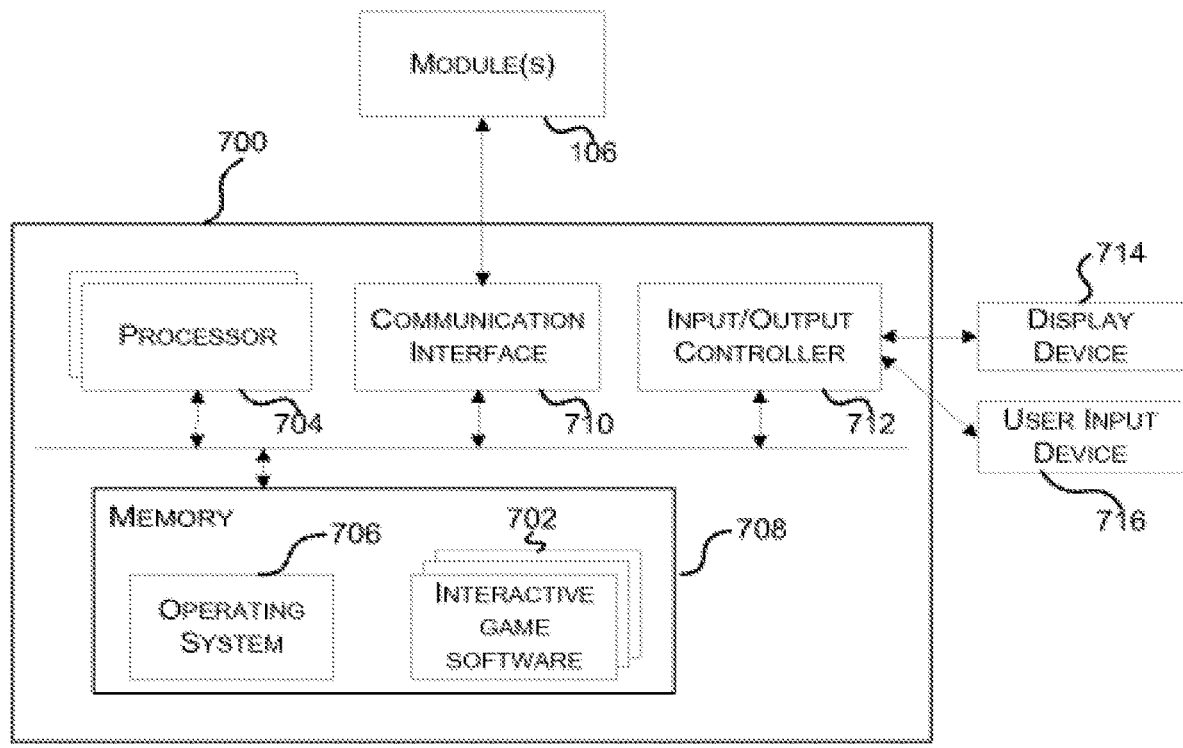
FIG. 7 illustrates an exemplary computing-based device in which embodiments of the methods described herein may be implemented.

FIG. 7 illustrates various components of an exemplary computing-based device 700 (such as computing device 104 in FIGS. 1 and 6 and computing device 604 in FIG. 6) which may be implemented as any form of a computing and/or electronic device, and on which the interactive game 702 may run. As shown in FIG. 8, the device may run more than one interactive game 802 and any object 108 may communicate with one or more games. In some examples, the game may be selected by the user and in other examples, the game may be determined based on the particular selection of modules assembled into the coherent physical whole 108 by the user. The interactive game 702 may be the full game 102 or the reduced game 602.

Computing-based device 700 comprises one or more processors 704 which may be microprocessors, controllers or any other suitable type of processors for processing computer executable instructions to control the operation of the device in order to run the game. In some examples, for example where a system on a chip architecture is used, the processors 704 may include one or more fixed function blocks (also referred to as accelerators) which implement a part of the functionality in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 706 or any other suitable platform software may be provided at the computing-based device to enable application software, such as the game(s) 702 to be executed on the device.

The computer executable instructions may be provided using any computer-readable media that is accessible by computing based device 700. Computer-readable media may include, for example, computer storage media such as memory 708 and communications media. Computer storage media, such as memory 708, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 708) is shown within the computing-based device 700 it will be appreciated that the storage may be distributed or located remotely and accessed via a network or other communication link (e.g. using communication interface 710).

The communication interface 710 enables the computing-based device 700 to communicate with modules 106, either directly or via a network or intermediary device. The communication interface 710 may use wired or wireless technology.

The computing-based device 700 also comprises an input/output controller 712 arranged to output display information to a display device 714 which may be separate from or integral to the computing-based device 700. The display information may provide a graphical user interface. The input/output controller 712 may also be arranged to receive and process input from one or more devices, such as a user input device 716 (e.g. a mouse, keyboard, camera, microphone or other sensor). In some examples the user input device 716 may detect voice input, user gestures or other user actions and may provide a natural user interface (NUI). This user input may be used to select or control the game 702. In various embodiments the display device 714 may also act as the user input device 716 if it is a touch sensitive display device. The input/output controller 712 may also output data to devices other than the display device, e.g. a locally connected printing device (not shown in FIG. 7).

Any of the input/output controller 712, display device 714 and the user input device 716 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in a gaming system as shown in FIGS. 1 and 6, with various scenarios shown in FIG. 5, the system described is provided as an example and not a limitation. As those skilled in the art will appreciate, the present examples are suitable for application in a variety of different types of gaming systems and the interactive computer game may provide any type of game play, including educational games, games which tell a story, etc.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing system, comprising:
   one or more processors; and one or more computer storage media holding instructions executable by the one or more processors to:
- receive, from one or more physical modules, data identifying a plurality of physical modules, the plurality of physical modules being connected together to form a coherent physical whole object which is freely movable;
- in response to receiving the data identifying the plurality of physical modules, present a virtual representation of the object via a user interface; and
- present an objective via the user interface, wherein the objective requires interaction with the object, wherein different physical modules of the plurality of physical modules have different virtual attributes that differently affect a manner in which the objective is achieved.

2. The computing system of claim 1, wherein the instructions are further executable by the one or more processors to:
- receive, from the one or more physical modules, data identifying a different physical module, the different physical module being connected in place of one other physical module of the plurality of physical modules to form an updated version of the object; and
- in response to receiving the data identifying the different physical module in place of the other physical module, present an updated virtual representation of the updated version of the object via the user interface, and wherein the different physical module has different virtual attributes than the virtual attributes of the other physical module that affect the objective differently.

3. The computing system of claim 1, wherein the object is formed from a plurality of different types of physical modules.

4. The computing system of claim 3, wherein for each physical module of a particular type, the physical module is one version selected from a plurality of different versions of the particular type that are connectable to form the object.

5. The computing system of claim 1, wherein the objective includes defeating a virtual character in the graphical interface.

6. The computing system of claim 1, wherein the object includes a vehicle.

7. The computing system of claim 6, wherein the plurality of physical modules correspond to different parts of the vehicle.

8. The computing system of claim 7, wherein at least one of the physical modules includes armor equipped to the vehicle.

9. The computing system of claim 1, wherein the different virtual attributes include different capabilities to defend against damage.

10. The computing system of claim 7, wherein at least one of the physical modules includes a weapon equipped to the vehicle.

11. The computing system of claim 1, wherein the different virtual attributes include different capabilities to cause damage.

12. A method of operating a computer application executable by a computing system, the method comprising:
- receiving, via a communication interface of the computing system, from one or more physical modules, data identifying a plurality of physical modules, the plurality of physical modules being connected together to form a coherent physical whole object which is freely movable;
- in response to receiving the data identifying the plurality of physical modules, presenting, via a user interface of the computer application, a virtual representation of the object; and
- presenting, via the user interface, an objective, wherein the objective requires interaction with the object, and wherein different physical modules of the plurality of physical modules have different virtual attributes that differently affect a manner in which the objective is achieved.

13. The method of claim 12, further comprising:
- receiving, via the communication interface of the computing system, from the one or more physical modules, data identifying a different physical module, the different physical module being connected in place of one other physical module of the plurality of physical modules to form an updated version of the object;
- in response to receiving the data identifying the different physical module in place of the other physical module, presenting, via the user interface of the computing system an updated virtual representation of the updated version of the object, and wherein the different physical module has different virtual attributes than the virtual attributes of the other physical module that affect the objective differently.

14. The method of claim 12, wherein the object includes a vehicle, and the plurality of physical modules correspond to different parts of the vehicle.

15. The method of claim 14, wherein at least one of the physical modules includes armor equipped to the vehicle.

16. The method of claim 15, wherein the different virtual attributes include different capabilities to defend against damage.

17. The method of claim 14, wherein at least one of the physical modules includes a weapon equipped to the vehicle.

18. The method of claim 17, wherein the weapon is one of a plurality of different types of weapons that are equipable to the vehicle, and wherein the different types of weapons have different virtual attributes including different levels of causing damage.

19. A computing system, comprising:
- one or more processors; and
- one or more computer storage media holding instructions executable by the one or more processors to:
  - receive, from one or more physical modules, data identifying a plurality of physical modules, the plurality of physical modules being connected together to form a coherent physical whole object which is freely movable;
  - in response to receiving the data identifying the plurality of physical modules, present a virtual representation of the object via a user interface;
  - present an objective via the user interface, wherein the objective requires interaction with the object;
  - receive, from the one or more physical modules, data identifying a different physical module, the different physical module being connected in place of one other physical module of the plurality of physical modules to form an updated version of the object; and
  - in response to receiving the data identifying the different physical module in place of the other physical module, present an updated virtual representation of the updated version of the object via the user interface, and wherein the different physical module has different virtual attributes than the virtual attributes of the other physical module that differently affect a manner in which the objective is achieved.

20. The computing system of claim 1, wherein the different virtual attributes of the different physical modules are predetermined for the different physical modules.

\* \* \* \* \*